United States Patent
Chiu et al.

(10) Patent No.: US 11,140,633 B2
(45) Date of Patent: Oct. 5, 2021

(54) METHOD AND APPARATUS FOR LOOPBACK GAIN STEP CALIBRATION ON RF CHAIN WITH PHASE SHIFTER

(71) Applicant: Samsung Electronics Co., Ltd., Suwon-si (KR)

(72) Inventors: Sung-En Chiu, San Diego, CA (US); Pranav Dayal, San Diego, CA (US); Kee-Bong Song, San Diego, CA (US); Siuchuang Ivan Lu, San Jose, CA (US); Hou-Shin Chen, San Diego, CA (US); Sang Won Son, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/944,116

(22) Filed: Jul. 30, 2020

(65) Prior Publication Data
US 2021/0258883 A1 Aug. 19, 2021

Related U.S. Application Data

(60) Provisional application No. 62/972,548, filed on Feb. 10, 2020.

(51) Int. Cl.
*H04W 52/08* (2009.01)
*H04W 52/24* (2009.01)

(52) U.S. Cl.
CPC ......... *H04W 52/08* (2013.01); *H04W 52/245* (2013.01)

(58) Field of Classification Search
CPC ............................ H04W 52/08; H04W 52/245
(Continued)

(56) References Cited

U.S. PATENT DOCUMENTS 5,724,645 A * 3/1998 Na ..................... H04H 40/90
455/3.02
5,835,850 A * 11/1998 Kumar ................ H04B 17/15
455/67.14
(Continued)

FOREIGN PATENT DOCUMENTS

EP 1331742 A2 7/2003

OTHER PUBLICATIONS

3GPP TS 38.101-2 "User Equipment (UE) radio transmission and reception; Part 2: Range 2 Standalone," V16.4.0 (Jun. 2020), Release 16.

*Primary Examiner* — Hai V Nguyen
(74) *Attorney, Agent, or Firm* — Lewis Roca Rothgerber Christie LLP (57) ABSTRACT

A method of gain step calibration by a user equipment (UE) includes selecting, a l th antenna path having a gain $G_T$ for a transmitter (Tx) of the UE and a corresponding m th antenna path having a gain $G_R$ for a receiver (Rx) of the UE; determining, a first loopback signal power for the l th antenna path having the gain $G_T$ for the transmitter (Tx) of the UE and the corresponding m th antenna path having the gain $G_R$ for the receiver (Rx) of the UE; determining, a second loopback signal power for the l th antenna path having a gain $G'_T$ for the transmitter (Tx) and the corresponding m th antenna path having the gain $G_R$ for the receiver (Rx); and determining, a transmitter gain step of the UE based on the first loopback signal power and the second loopback signal power.

20 Claims, 8 Drawing Sheets

(58) Field of Classification Search
USPC .......................................................... 455/522
See application file for complete search history.

(56) References Cited

U.S. PATENT DOCUMENTS

| | | | |
|---|---|---|---|
| 6,437,740 B1* | 8/2002 | De Champlain | H01Q 1/22 342/417 |
| 6,587,080 B1* | 7/2003 | De Champlain | H01Q 21/29 342/450 |
| 6,590,535 B1* | 7/2003 | De Champlain | H01Q 1/2225 342/450 |
| 6,683,567 B2* | 1/2004 | De Champlain | G01S 3/18 342/385 |
| 6,701,264 B2 | 3/2004 | Caso et al. | |
| 6,735,422 B1 | 5/2004 | Baldwin et al. | |
| 6,774,845 B2* | 8/2004 | De Champlain | G01S 3/18 342/374 |
| 7,043,199 B2* | 5/2006 | Dai | H04B 7/18543 455/12.1 |
| 7,197,282 B2* | 3/2007 | Dent | H04B 7/005 370/329 |
| 7,254,340 B2* | 8/2007 | Jung | H04B 10/2587 398/169 |
| 7,415,253 B2* | 8/2008 | Carter | H04W 52/225 455/127.1 |
| 7,573,410 B1 | 8/2009 | Georgantas et al. | |
| 8,175,549 B2 | 5/2012 | Faust et al. | |
| 8,320,851 B2* | 11/2012 | Takano | H01Q 3/2605 455/114.2 |
| 8,463,189 B2* | 6/2013 | Bashir | H03F 3/217 455/63.1 |
| 8,489,045 B2* | 7/2013 | Ly-Gagnon | H04B 17/13 455/115.1 |
| 8,615,204 B2* | 12/2013 | Husted | H04B 17/11 455/88 |
| 8,681,896 B1* | 3/2014 | Chen | H04B 1/30 375/296 |
| 8,711,905 B2* | 4/2014 | Kravitz | H04B 17/14 375/219 |
| 8,873,676 B2 | 10/2014 | Rozenblit et al. | |
| 8,953,663 B2* | 2/2015 | Kravitz | H04B 1/30 375/221 |
| 9,088,448 B2* | 7/2015 | Nicolson | H04B 17/14 |
| 9,509,355 B2* | 11/2016 | Kravitz | H04B 1/30 |
| 9,537,584 B2* | 1/2017 | Nicolson | H01Q 3/267 |
| 9,590,747 B2* | 3/2017 | Thoukydides | H04B 17/21 |
| 9,621,330 B2* | 4/2017 | Vassiliou | H04B 17/13 |
| 9,621,337 B2* | 4/2017 | Hao | H04L 7/0091 |
| 9,628,203 B2* | 4/2017 | Weissman | H04B 1/40 |
| 9,641,126 B2* | 5/2017 | Fernandes Barros | H04B 17/14 |
| 9,667,282 B1* | 5/2017 | Merlin | H04B 1/04 |
| 9,813,169 B2* | 11/2017 | Einzinger | H04B 17/14 |
| 9,882,613 B2* | 1/2018 | Daniel | H04B 7/022 |
| 10,079,702 B2* | 9/2018 | Chee | H04L 27/0002 |
| 10,135,550 B1* | 11/2018 | Cheng | H04B 17/14 |
| 10,141,985 B2* | 11/2018 | Daniel | H04B 7/022 |
| 10,153,792 B2* | 12/2018 | Merlin | H04B 1/0458 |
| 10,396,845 B2* | 8/2019 | Vassiliou | H04B 1/26 |
| 10,455,496 B2* | 10/2019 | Wich | H04W 52/367 |
| 10,469,036 B2* | 11/2019 | Benjamin | H03G 3/3042 |
| 10,598,767 B2* | 3/2020 | Subburaj | G01S 7/032 |
| 10,771,208 B2* | 9/2020 | Wu | H04L 1/0071 |
| 10,992,373 B2* | 4/2021 | Buer | H01Q 1/288 |
| 2003/0036359 A1* | 2/2003 | Dent | H04B 7/022 455/63.1 |
| 2003/0117318 A1* | 6/2003 | Champlain | G01S 13/785 342/387 |
| 2004/0097212 A1 | 5/2004 | Matsumoto et al. | |
| 2004/0130488 A1* | 7/2004 | De Champlain | G01S 13/788 342/374 |
| 2004/0147277 A1* | 7/2004 | Kaewell | H04B 1/036 455/522 |
| 2005/0288052 A1* | 12/2005 | Carter | H04W 52/225 455/522 |
| 2006/0176975 A1 | 8/2006 | Hsieh et al. | |
| 2008/0242294 A1 | 10/2008 | Sampath et al. | |
| 2009/0005103 A1* | 1/2009 | Eisenstadt | H04B 17/19 455/522 |
| 2010/0026561 A1* | 2/2010 | Takano | H04B 17/14 342/174 |
| 2011/0063169 A1* | 3/2011 | Chen | H01Q 3/267 342/368 |
| 2011/0075715 A1* | 3/2011 | Kravitz | H04L 27/3863 375/221 |
| 2011/0292978 A1* | 12/2011 | Kravitz | H04L 27/3863 375/221 |
| 2012/0252382 A1* | 10/2012 | Bashir | H03F 3/217 455/114.3 |
| 2012/0306572 A1 | 12/2012 | Hietala et al. | |
| 2013/0052964 A1* | 2/2013 | Husted | H04B 17/11 455/73 |
| 2013/0122956 A1* | 5/2013 | Lee | H04B 17/21 455/522 |
| 2013/0137381 A1* | 5/2013 | Vassiliou | H04B 1/56 455/67.15 |
| 2013/0156085 A1* | 6/2013 | Nicolson | H04L 25/03878 375/229 |
| 2013/0301688 A1* | 11/2013 | Khandani | H04B 7/026 375/211 |
| 2014/0065993 A1 | 3/2014 | Deforeit et al. | |
| 2014/0256376 A1* | 9/2014 | Weissman | H04B 17/19 455/550.1 |
| 2015/0036727 A1* | 2/2015 | Kravitz | H04B 1/0475 375/221 |
| 2015/0118970 A1* | 4/2015 | Thoukydides | H04B 17/21 455/67.14 |
| 2015/0120219 A1* | 4/2015 | Merlin | H04B 1/0458 702/58 |
| 2015/0180415 A1* | 6/2015 | Fernandes Barros | H04B 17/14 375/219 |
| 2015/0256272 A1* | 9/2015 | Weissman | H03F 3/211 455/84 |
| 2015/0270911 A1* | 9/2015 | Nicolson | H04L 25/03878 375/221 |
| 2015/0280946 A1 | 10/2015 | Sabouri et al. | |
| 2016/0105299 A1* | 4/2016 | Chee | H03F 1/0205 375/297 |
| 2016/0302159 A1* | 10/2016 | Wong | H04W 52/245 |
| 2016/0352612 A1* | 12/2016 | Daniel | H04B 7/022 |
| 2016/0359614 A1* | 12/2016 | Hao | H04L 7/033 |
| 2017/0090014 A1* | 3/2017 | Subburaj | G01S 7/4004 |
| 2017/0149512 A1* | 5/2017 | Einzinger | H04W 52/52 |
| 2017/0179999 A1* | 6/2017 | Vassiliou | H04L 5/143 |
| 2018/0005857 A1 | 1/2018 | Zhang et al. | |
| 2018/0019800 A1* | 1/2018 | Buer | H01Q 1/06 |
| 2018/0041270 A1* | 2/2018 | Buer | H04B 7/2041 |
| 2018/0131417 A1* | 5/2018 | Daniel | H04B 7/022 |
| 2018/0310244 A1* | 10/2018 | Wich | H04W 52/243 |
| 2019/0007086 A1* | 1/2019 | Mofidi | H04B 1/006 |
| 2019/0109635 A1* | 4/2019 | Buer | H04W 56/001 |
| 2019/0222375 A1* | 7/2019 | Wu | H04L 1/007 |
| 2019/0386869 A1* | 12/2019 | Dao | H03D 3/009 |
| 2020/0091608 A1* | 3/2020 | Alpman | H01Q 5/47 |
| 2020/0132810 A1* | 4/2020 | Subburaj | G01S 7/4008 |
| 2020/0220564 A1* | 7/2020 | Almog | H04B 1/525 |
| 2021/0116501 A1* | 4/2021 | Martineau | G01R 31/31724 |

* cited by examiner

METHOD AND APPARATUS FOR LOOPBACK GAIN STEP CALIBRATION ON RF CHAIN WITH PHASE SHIFTER

CROSS-REFERENCE TO RELATED APPLICATION(S)

The present application claims priority to and the benefit of U.S. Provisional Patent Application Ser. No. 62/972,548, filed Feb. 10, 2020 and entitled "METHOD AND APPARATUS FOR PROVIDING LOOPBACK GAIN STEP CALIBRATION ON RADIO FREQUENCY (RF) CHAIN WITH PHASE SHIFTER," the entire content of which is hereby expressly incorporated by reference.

FIELD

One or more aspects of the present disclosure relate to radio frequency (RF) circuits, and more particularly to method and apparatus for loopback gain step calibration on RF chain with phase shifters.

BACKGROUND

In a radio frequency (RF) device, the RF front end may be defined as the circuit components between the antenna and the intermediate frequency (IF) stage and may include a plurality of transmitter (Tx) and/or receiver (Rx) antennas, filters, low noise amplifiers (LNA), mixers, phase shifters (PS), and local oscillators. RF front end may convert information from the near-zero frequency baseband signals used to convey information and data to radio-signals that may be received or transmitted over the air.

The above information in the Background section is only for enhancement of understanding of the background of the technology and therefore it should not be construed as admission of existence or relevancy of the prior art.

SUMMARY

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

Aspects of example embodiments of the present disclosure relate to radio frequency (RF) circuits, and more particularly to method and apparatus for loopback gain step calibration on RF chain with phase shifters.

In some embodiments, a method of gain step calibration by a user equipment (UE) includes selecting, by the UE, a l th antenna path having a gain $G_T$ for a transmitter (Tx) of the UE and a corresponding m th antenna path having a gain $G_R$ for a receiver (Rx) of the UE; determining, by the UE, a first loopback signal power for the l th antenna path having the gain $G_T$ for the transmitter (Tx) of the UE and the corresponding m th antenna path having the gain $G_R$ for the receiver (Rx) of the UE; determining, by the UE, a second loopback signal power for the l th antenna path having a gain $G'_T$ for the transmitter (Tx) of the UE and the corresponding m th antenna path having the gain $G_R$ for the receiver (Rx) of the UE; and determining, by the UE, a transmitter gain step of the UE based on the first loopback signal power and the second loopback signal power.

In some embodiments, the transmitter gain step is a ratio of the first loopback signal power and the second loopback signal power, and wherein l=1, 2, . . . , $L_T$ and m E 1, 2, . . . , $L_R$. In some embodiments, the method further includes turning on, by the UE, the m th antenna path with the gain $G_R$ for the receiver (Rx) of the UE; measuring, by the UE, leakage signal power and noise power; and turning on, by the UE, the l th antenna path for the transmitter (Tx) and the corresponding m th antenna path for the receiver (Rx) to determine the first loopback signal power and the second loopback signal power.

In some embodiments, determining the first loopback signal power includes determining loopback signal power for each phase shifter from among K phase shifters, for the l th antenna path having the gain $G_T$ for the transmitter (Tx) and the corresponding m th antenna path having the gain $G_R$ for the receiver (Rx); and determining, by the UE, total receiver (Rx) signal power based on the loopback signal power for each phase shifter from among K phase shifters.

In some embodiments, the method further includes averaging the total receiver (Rx) signal power for gain $G_T$ over K different phase shifters with values such that $$\sum_{k=1}^{K} e^{-j\phi_k} = 0,$$

wherein the correlated terms are canceled. In some embodiments, the first loopback signal power for the gain $G_T$ is determined by subtracting the leakage signal power and noise power from the averaged total receiver (Rx) signal power for the gain $G_T$; and wherein the second loopback signal power for the gain $G'_T$ is determined by subtracting the leakage signal power and noise power from the averaged total receiver (Rx) signal power for the gain $G'_T$.

In some embodiments, the total power measured at the receiver (Rx) for the gain $G_T$ includes the first loopback signal power for the gain $G_T$ and the leakage signal power. In some embodiments, the method further includes determining, by the UE, gain steps for each of the antenna paths l=1, 2, . . . , $L_T$ for the transmitter (Tx). In some embodiments, the method further includes determining, by the UE, an overall gain step of all of the antenna paths l=1, 2, . . . , $L_T$ by averaging the gain steps for each of the antenna paths l=1, 2, . . . , $L_T$.

In some embodiments, a method of gain step calibration by a user equipment (UE) includes turning on, by the UE, a l th antenna path having a gain $G_T$ for a transmitter (Tx) of the UE and a corresponding m th antenna path having a gain $G_R$ for a receiver (Rx) of the UE; measuring, by the UE, loopback quadrature signals or in-phase and quadrature (IQ) samples for each phase shifters from among K phase shifters of the UE; determining, by the UE, loopback measurement signal for each phase shifter from among K phase shifters of the UE based on the measured loopback IQ samples of the corresponding phase shifter; synchronizing, by the UE, the loopback measurement signal for each phase shifter, of the K phase shifters of the UE with a transmitter (Tx) generated signal; and determining, by the UE, a first total loopback signal by coherently combining the synchronized loopback measurement signals for each of the K phase shifters of the UE.

In some embodiments, the first total loopback signal includes phase shift effect of each of the K phase shifters, the transmitter (Tx) generated signal, an equivalent base band (BB) channel of over-the-air loopback coupling path between the l th antenna path for the transmitter (Tx) and the m th antenna path for the receiver (Rx), a flexible printed circuit board (FPCB) cable loss, and additive noise. In some embodiments, the total loopback signal is determined such that $$\sum_k e^{j\phi_k} = 0,$$

where $e^{j\phi_k}$ is the phase shift effect, wherein $$\sum_{k=1}^{K} e^{-j\phi_k} = 0,$$

and wherein the method further includes cancelling, by the UE, incoherent leakage signals of the loopback measurement signal for each phase shifter of the K phase shifters.

In some embodiments, the method further includes determining, by the UE, a first loopback signal power for the l th antenna path having the gain $G_T$ for the transmitter (Tx) and the corresponding m th antenna path having the gain $G_R$ for the receiver (Rx); determining, by the UE, a second loopback signal power for the l th antenna path having a gain $G'_T$ for the transmitter (Tx) of the UE and the corresponding m th antenna path having the gain $G_R$ for the receiver (Rx) of the UE; and determining, by the UE, a transmitter gain step of the UE based on the first loopback signal power and the second loopback signal power.

In some embodiments, the transmitter gain step is a ratio of the first loopback signal power and the second loopback signal power, and wherein l=1, 2, ..., $L_T$ and m∈1, 2, ..., $L_R$. In some embodiments, the first loopback signal power is determined by subtracting $$\frac{\sigma^2}{K}$$

from power of the first total loopback signal, where K is the total number of phase shifters and $\sigma^2$ is noise power.

In some embodiments, a method of gain step calibration by a user equipment (UE) includes turning on, by the UE, a l th antenna path having a gain $G_T$ for a transmitter (Tx) of the UE and a corresponding m th antenna path having a gain $G_R$ for a receiver (Rx) of the UE; measuring, by the UE, loopback quadrature signals or in-phase and quadrature (IQ) samples for a first phase shifter and a second phase shifter of the UE; determining, by the UE, a first loopback measurement signal for the first phase shifter and a second loopback measurement signal for the second phase shifter based on the measured loopback IQ samples of the first phase shifter and the second phase shifter; synchronizing, by the UE, each of the first loopback measurement signal for the first phase shifter and the second loopback measurement signal for the second phase shifter with a transmitter (Tx) generated signal; and determining, by the UE, a first total loopback signal by determining a difference between the synchronized first loopback measurement signal for the first phase shifter and the synchronized second loopback measurement signal for the second phase shifter.

In some embodiments, the method further includes determining, by the UE, a first loopback signal power for the l th antenna path having the gain $G_T$ for the transmitter (Tx) of the UE and the corresponding m th antenna path having the gain $G_R$ for the receiver (Rx) of the UE; and determining, by the UE, a second loopback signal power for the l th antenna path having a gain $G'_T$ for the transmitter (Tx) of the UE and the corresponding m th antenna path having the gain $G_R$ for the receiver (Rx) of the UE.

In some embodiments, the method of further includes determining, by the UE, a transmitter gain step of the UE based on the first loopback signal power and the second loopback signal power. In some embodiments, the transmitter gain step is a ratio of the first loopback signal power and the second loopback signal power, and wherein l=1, 2, ..., $L_T$ and m∈1, 2, ..., $L_R$. In some embodiments, the first loopback signal power is determined by subtracting noise power from power of the first total loopback signal.

BRIEF DESCRIPTION OF THE DRAWINGS

These and other features of some example embodiments of the present disclosure will be appreciated and understood with reference to the specification, claims, and appended drawings, wherein:

DETAILED DESCRIPTION

The detailed description set forth below in connection with the appended drawings is intended as a description of some example embodiments of method and apparatus for loopback gain step calibration on RF chain with phase shifters provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the scope of the present disclosure.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the present disclosure. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present disclosure refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

In some embodiments, one or more outputs of the different embodiments of the methods and systems of the present disclosure may be transmitted to an electronics device coupled to or having a display device for displaying the one or more outputs or information regarding the one or more outputs of the different embodiments of the methods and systems of the present disclosure.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

FIGS. 1A-1D illustrate a RF front end device 100, according to some embodiments of the present disclosure. The RF front end device 100 may be part of a user equipment (UE).

The RF frond end device 100 includes a radio frequency (RF) front end 102 and a radio frequency integrated circuit (RFIC) 104. In a radio frequency (RF) device, the RF front end (e.g., RF front end 102) may be defined as the circuit components between the antenna and the intermediate frequency (IF) stage and may include a plurality of transmitter (Tx) and/or receiver (Rx) antennas (e.g., 106), filters, low noise amplifiers (LNA), mixer, phase shifters (PS), and local oscillators.

RF front end 102 may convert information from the near-zero frequency baseband signals used to convey information and data to radio-signals that may be received or transmitted over the air. In an UE, there are multiple antennas to transmit and receive signals. For each antenna, there is a path (e.g., RF chain) either to transmit or receive to get the signal from the antenna to the modem. As more antennas are added to the device, more RF chains may be needed. Each RF chain includes a series of components including an RF filter (e.g., a band-pass filter that receives the electromagnetic wave from the antenna to remove the image frequency and to prevent out-of-band signals from saturating the input stages), an RF amplifier (e.g., an RF amplifier used to amplify weak signals without adding noise), a local oscillator (e.g., a local oscillator that generates a stable radio frequency signal close to the input signal), a mixer (e.g., a mixer to produce a signal at a certain desired frequency by "mixing" the electromagnetic wave signal from the antenna with the local oscillator signal).

The transmitter (Tx) and/or receiver (Rx) antenna and radio frequency (RF) chain in a RF front end device (e.g., RF front end 102) may be designed to achieve desired transmitted and/or received signal power by setting (or tuning) the internal components of the RF front end device, for example, RF mixer, power amplifier, low noise amplifier (LNA), combiner, filter, etc., to certain gain states.

Because of manufacturing variation of the modules (e.g., the internal components of the RF front end device), the gain provided by the RFIC may have variation (e.g., the gain variation) from module to module. For example, after the RFIC is manufactured, the Tx gain and the Rx gain provided by the RFIC may be different from the gain of the nominal design. In some cases, when the modules are assembled together into the final device (e.g., a user equipment (UE)), the actual gain of the device may change (e.g., from the gain of the nominal design) due to the change in impedance. Such uncertainty in the signal gain may create inaccuracy in the Tx/Rx signal power control. In some cases, the transmit power and the received power of each gain state may be calibrated in order to meet the requirements of power control. However, due to limited dynamic range, the power detector (PDET) equipped at the Tx and Rx path may only provide accurate Tx and/or Rx power estimate for certain range of Tx and/or Rx gain, for example, at the largest or at a relatively larger gain state. Therefore, a self-calibration method without external equipment for calibrating the RFIC gain may be desired.

One or more embodiments of the present disclosure provide a method to calibrate the Tx/Rx gain step between different gain states. In one or more embodiments of the present disclosure, the gain step calibration of different gain states may be performed by the modem and RFIC loopback itself (e.g., by turning on Tx and Rx simultaneously) without any external equipment. The phase shifter in the phase array may be used to eliminate the effect of the internal leakage. For example, with each of the Tx and/or Rx gain states, the internal leakage signals may be measured first by turning on the Rx chain while turning off the Tx chain. Next, the loopback signals may be measured by turning on both Tx and Rx chain, where the loopback measurements are performed multiple times with multiple different phase shifters. With the measurements of loopback signals of different phase shifters and the leakage signal, the gain step may be estimated by a certain average procedure applying on those measurements. For example, for Tx gain step calibration, the input signal power may be set to be at the operating point and only one Tx path may be activated at a time. In such a case, a desired Rx path may be chosen with a Rx gain. The gain step for each path is then combined to obtain the gain step while activating all paths. On the other hand, for example, for Rx gain step calibration, the input signal power and Tx gain may be set such that lookback signal power is at a desired range.

Figure 1A:
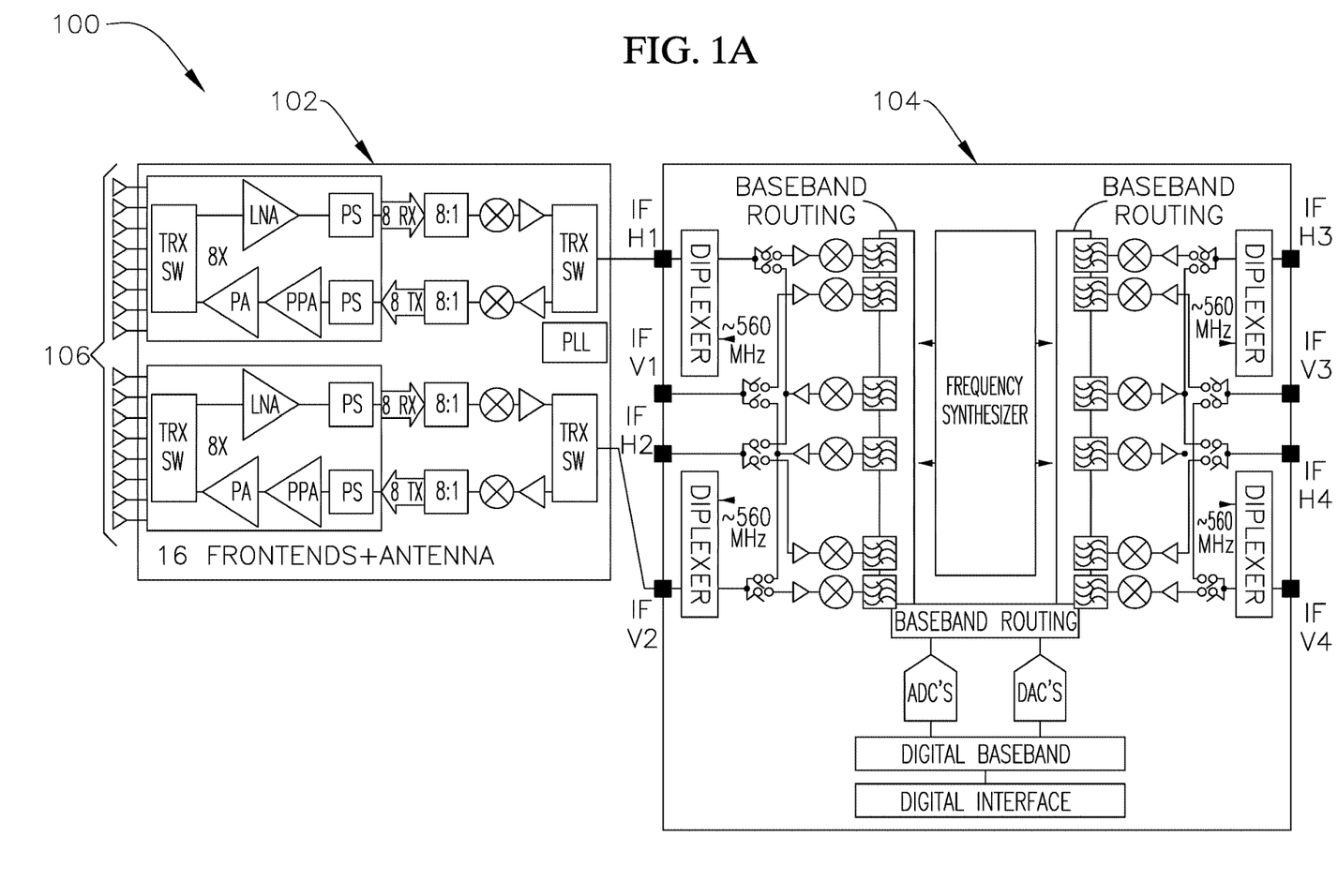
FIGS. 1A-1D illustrate a RF front end device, according to some embodiments of the present disclosure.
Figure 1B:
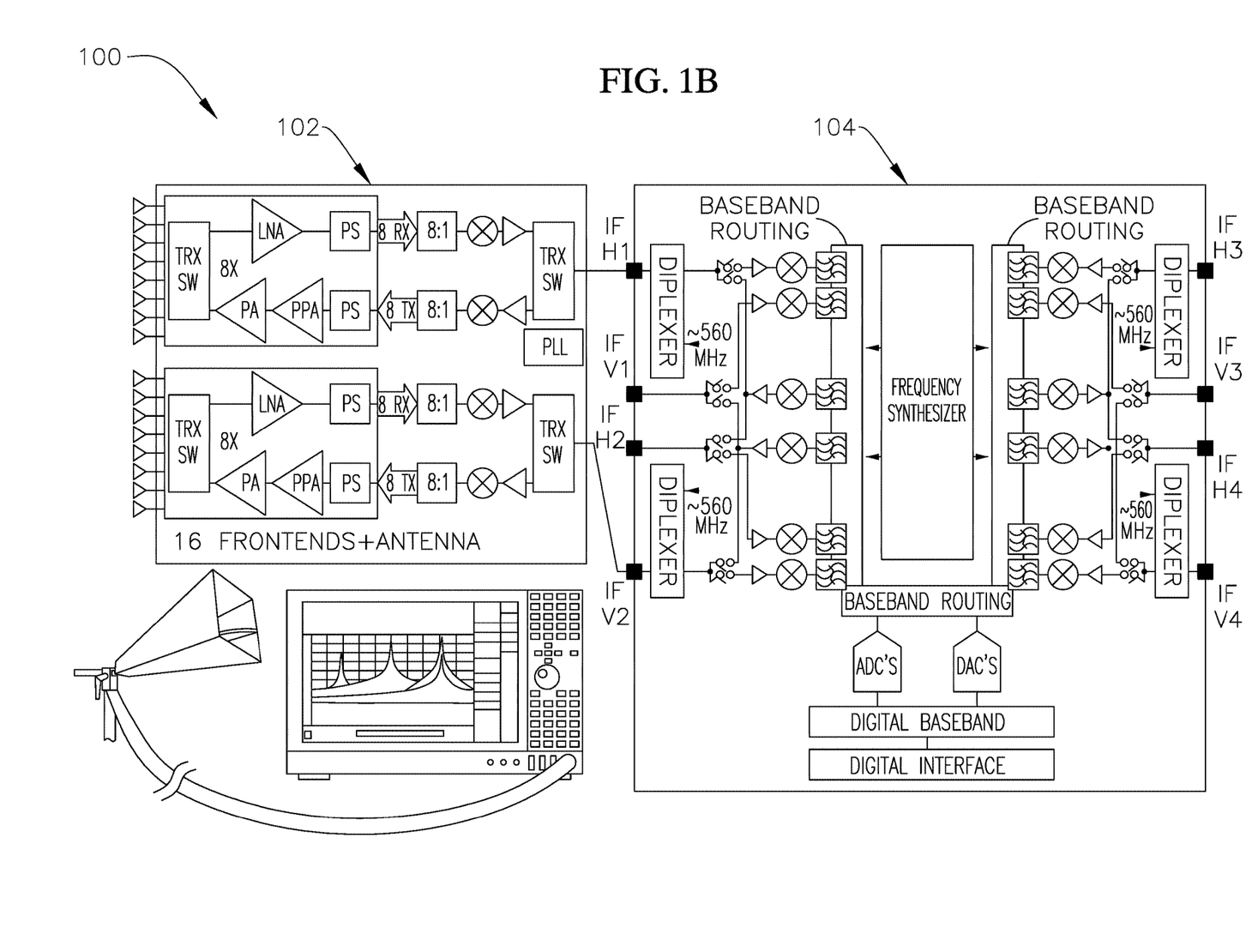

In some cases, given that one of the gain (e.g., the largest gain) is calibrated by external equipment (as shown in FIG. 1B) during the module calibration and by the PDET after the assembly of the UE, only the relative gain, e.g., the gain step between each of the gain states, may be needed for self-calibration. The gain steps and the largest gain may recover the gain for all the gain steps. On the other hand, the gain step without any external equipment may be calibrated as a reference by using the Rx path in the device itself to measure the power (e.g., the relative power) from using different Tx and/or Rx gain states. For example, by turning on both Tx and Rx path, the signal loopback over-the-air through coupling of the antennas may be measured on the module itself.

Figure 1C:
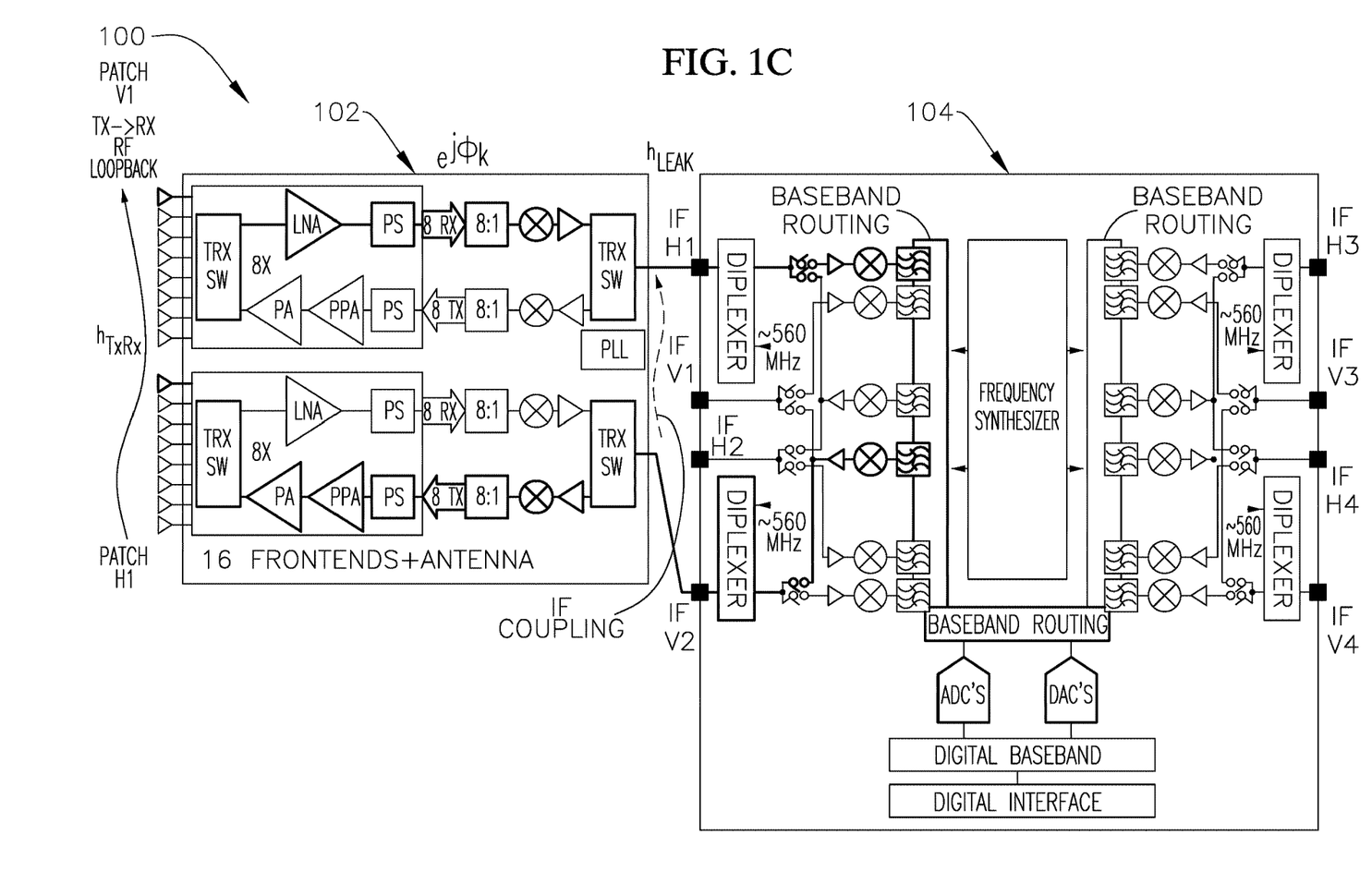

As shown in FIG. 1C, the whole loopback measurement include two paths, for example, loopback path through Tx/Rx antenna coupling and leakage path through IF coupling. In one or more embodiments, the loopback path through Tx/Rx antenna coupling (or loopback antenna coupling path) may include flexible printed circuit board (FPCB) cable loss (e.g., $L_{FPCB}$), Tx RFIC gain (e.g., $G_T$, which is the overall Tx gain), Tx/Rx antenna coupling (e.g., Tx/Rx antenna coupling over-the-air channel, e.g., $h_{TxRx}$, which is the equivalent BB channel of the over-the-air loopback coupling path between the activated Tx and Rx paths), Tx phase shifter (PS) and Rx phase shifter (e.g., $e^{j\Phi_k}$, which is the PS effect), and Rx RFIC gain (e.g., $G_R$, which is the overall Rx gain). Leakage path through IF coupling may include Tx gain provided at IF and base band (BB) (e.g., $G_T^{leak}$, which is the Tx gain that the leakage path passed through), IF coupling loss (e.g., $h_{leak}$, which is the equivalent BB channel of the internal leakage path), and Rx gain provided at IF and BB (e.g., $G_R^{leak}$, which is the Rx gain that the leakage path passed through).

As discussed above, the RFIC gain is in the loopback antenna coupling path. Therefore, the gain step may be calibrated with the step of the signal power of the antenna coupling path by using different RFIC gain states.

For example, the gain step $$\frac{G_T}{G'_T}$$

gain states $G_T$, $G'_T$ may be calibrated to estimate the Tx gain step. For example, for Tx antenna paths $l=1, 2, \ldots, L_T$, the gain step $$\left(\frac{G_T}{G'_T}\right)_l$$

may be obtained one-by-one, and in some cases an average to recover the final gain step of all active paths $l=1, 2, \ldots, L_T$, may be obtained. The gain step for a Tx antenna path may be obtained by the loopback signal power $\hat{P}_s(G_T, G_R)$ for a state $G_T$ and the loopback signal power $\hat{P}_s(G'_T, G_R)$ for a state $G'_T$. For example, the gain step may be represented as:

$$\left|\frac{G_T}{G'_T}\right|^2 = \frac{\hat{P}_s(G_T, G_R)}{\hat{P}_s(G'_T, G_R)}$$

The loopback signal power may be obtained from the loopback signal. The total loopback signal may be determined by turning on both the Tx and Rx at the same time with a fixed set of Tx antenna paths and Rx antenna paths (for example, as shown in the highlighted Tx antenna path and the Rx antenna path in FIG. 1C).

For example, the UE may only turn on the lth antenna path for Tx (where $l=1, 2, \ldots, L_T$) with gain $G_T$, and choose a proper Rx antenna path $m \in 1, 2, \ldots, L_R$ and a proper Rx gain state $G_R$ for Tx-Rx loopback. For example, by turning on both the Tx and Rx at the same time with a fixed set of Tx antenna paths and Rx antenna paths, the total loopback measurement signal may be represented as:

$$y_k[n] = G_R e^{j\phi_k} h_{TxRx} G_T L_{FPCB} x[n] + G_R^{leak} h_{leak} G_T^{leak} x[n] + w_k[n], n=1,\ldots,N, k=1,\ldots,K, \quad (1)$$

where, N is the number of samples of the generated signal,
K is the number of phase shifters,
x[n] is the generated Tx signal at BB;
$G_T$ is the overall Tx gain;
$L_{FPCB}$ is the FPCB cable loss;
$h_{TxRx}$ is the equivalent BB channel of the over-the-air loopback coupling path between the activated Tx and Rx paths;
$e^{j\phi_k}$ is the PS effect (e.g., different Rx phaser shifter (PS) may be used for Tx gain step calibration, and different Tx PS may be used for Rx gain step (GS) calibration, where $\phi_k$ is the phase of the kth phase shifter);
$G_R$ is the overall Rx gain;
$h_{leak}$ is the equivalent BB channel of the internal leakage path;
$G_T^{leak}$ is the Tx gain that the leakage path passed through (e.g. RFIC gain for IF leakage);
$G_R^{leak}$ is the Rx gain that the leakage path passed through;
$w_k[n]$ is the additive noise with variance $\rho^2$.

As evident from above, the total loopback measurement signal $y_k[n]$ includes the loopback antenna coupling path and the leakage coupling path. Therefore, the RFIC gain may be in the loopback antenna coupling path. As such, the gain step may be calibrated with the signal power of the antenna coupling path by using different RFIC gain states.

For example, if the power of the generated Tx signal $P_x$ is assumed to be:

$$P_x = (1/N) \sum_{n=1}^{N} |x[n]|^2,$$

the power of antenna-coupling loopback signal $(G_R e^{j\phi_k} h_{TxRx} G_T L_{FPCB} x[n])$ may be written as:

$$P_S(G_T, G_R) = \quad (2)$$
$$\frac{1}{N} \sum_{n=1}^{N} |G_R e^{j\phi_k} h_{TxRx} G_T L_{FPCB} x[n]|^2 = |G_R h_{TxRx} G_T L_{FPCB}|^2 P_x$$

As evident from above equation (2), that equation (2) scales with both $G_R$ and $G_T$ linearly. Therefore, the gain step of any two different Tx/Rx gain state may be calculated from $P_s(G_T, G_R)$ (or equation (2)) by comparing the respective antenna-coupling loopback signal power, which may be represented as:

$$\left|\frac{G_T}{G_T'}\right|^2 = \frac{P_S(G_T, G_R)}{P_S(G_T', G_R)} \quad (3)$$

for two different Tx gain states $G_T$ and $G_T'$.

However, under the loopback mode, the Rx measured $y_k[n]$ in equation (1) contains not only the antenna-coupling loopback signal, but also the internal leakage and the noise. For example, the signal via the leakage path through IF coupling is also added into the Rx measured signal in the loopback configuration. Such leakage may act as an obstruction in obtaining the antenna-coupling loopback signal power and may also obstruct the accurate calibration of the gain step.

In order to nullify or reduce the effect of the internal IF leakage, in one or more embodiments, the built-in phase shifter in the phase array chip (e.g., RFIC) may be used. Because, the internal leakage happens at IF, changing the phase shifters at the RF front-end only changes the antenna-coupling loopback signal path but has no effect or minimal effect on the IF leakage path.

One or more embodiments of the present disclosure provide methods to calibrate gain step (e.g., relative gain between different gain states) by loopback measurements. One or more embodiments of the present disclosure may nullify or reduce the effect of the IF leakage by exploiting the phase shifter to calibrate the Tx/Rx gain step regardless the presence of the IF leakage.

Phase Averaging (PhAvg)

For example, according to one or more embodiments of the present disclosure, phase averaging (PhAvg) may be used to nullify or reduce the effect of the IF leakage and determine gain step accordingly. The phase averaging (PhAvg) method may rely on power measurements, and no hard ware (HW) modifications may be needed for the implementation of such method. In one or more embodiments, using the phase averaging (PhAvg) method, the gain step calibration error may be reduced from about 35 dB error of using loopback measurements, to be within 0.5 dB.

In some embodiments, the phase averaging method to nullify or reduce the leakage and estimate the power of antenna-coupling loopback signal $P_s(G_T, G_R)$ from the Rx measured signal $y_k[n]$ is discussed below.

In the phase averaging (PhAvg) method, first, the loopback total power may be measured by turning on Tx and Rx (e.g., leakage path ($h_{leak}$)+antenna coupling path ($h_{TxRx}$)), as shown in FIG. 1C.

The total power measured at Rx can be written as $$P_T(G_T, G_R, k) = \frac{1}{N} \sum_{n=1}^{N} |y_k[n]|^2 \approx P_S(G_T, G_R) + \quad (4)$$
$$P_{leak} + 2\text{Re}\{G_R h_{TxRx} G_T e^{j\phi_k} (G_R^{leak})^* h_{leak}^* (G_T^{leak})^*\} + \sigma^2,$$

where $$P_{leak} = (1/N) \sum_{n=1}^{N} |G_R^{leak} h_{leak} G_T^{leak} x[n]|^2$$

is the leakage signal power.

Next, $P_T(k)$ may be averaged over different phase shifter with values such that $\Sigma_k e^{j\phi_k} = 0$ and the correlated terms may be canceled. For example, by using K different PS such that $$\sum_{k=1}^{K} e^{j\phi_k} = 0. \quad (5)$$

Figure 1D:
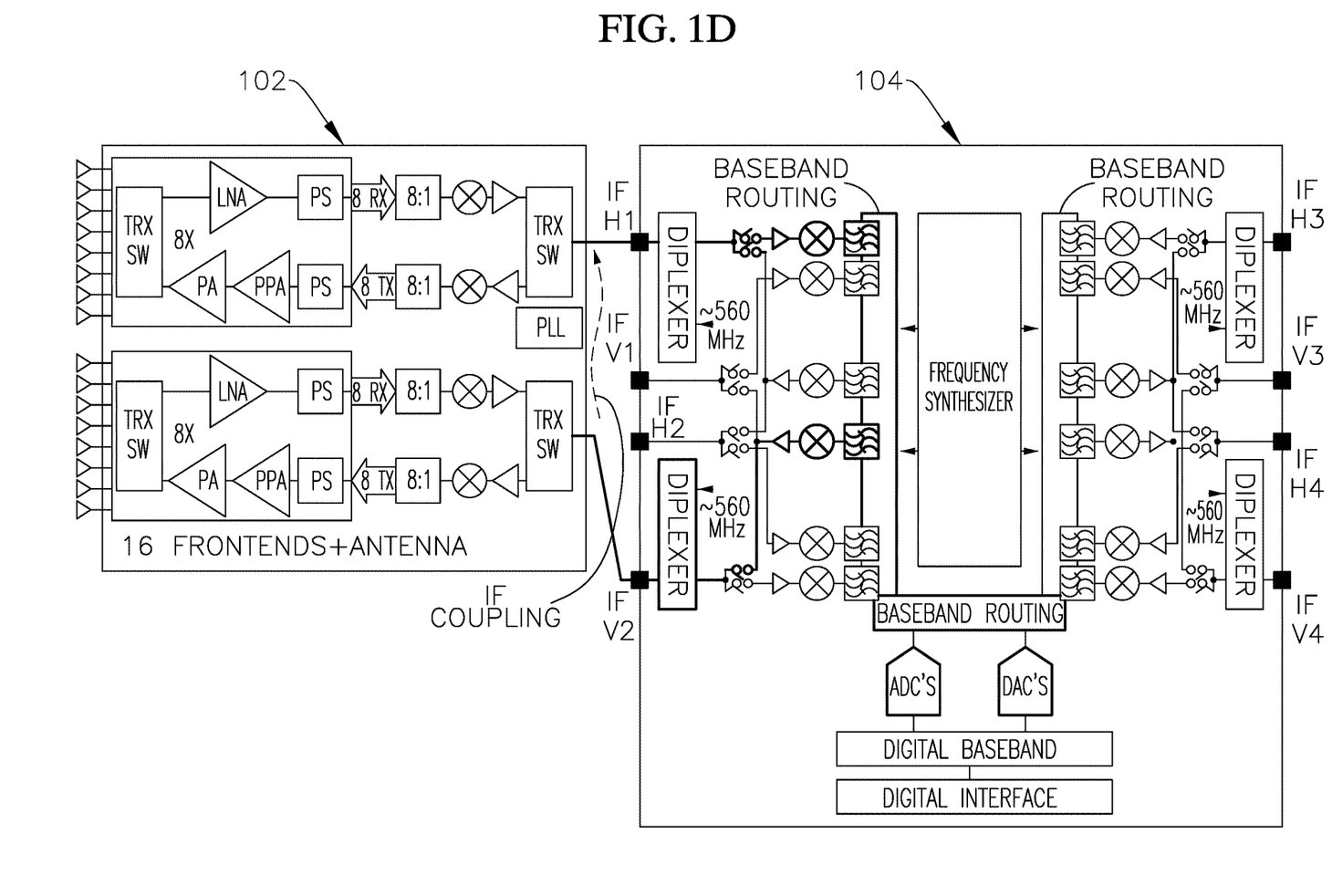

Therefore, the loopback signal power may be estimated as:

$$\hat{P}_s(G_T, G_R) = \frac{1}{K}\sum_{k=1}^{K} P_T(G_T, G_R, k) - P_0, \quad (6)$$

where $P_0 = P_{leak} + \sigma^2$ is the leakage signal power plus noise power and may be measured by turning only the RFIC on but turning off front-end, as illustrated in FIG. 1D.

Similarly, the loopback signal power for a different gain state $G'_T$ may be determined the same way and may be represented as $\hat{P}_s(G'_T, G_R)$, where $$\hat{P}_s(G'_T, G_R) = \frac{1}{K}\sum_{k=1}^{K} P_T(G'_T, G_R, k) - P_0.$$

As discussed with respect to equation (3), next, the transmitter gain step is determined as a ratio of the loopback signal power for the gain state $G_T$ and the loopback signal power for the gain state $G'_T$ as:

$$\left|\frac{G_T}{G'_T}\right|^2 = \frac{\hat{P}_s(G_T, G_R)}{\hat{P}_s(G'_T, G_R)} \approx \frac{|G_R h_{TxRx} G_T L_{FPCB}|^2}{|G_R h_{TxRx} G'_T L_{FPCB}|^2} = \left|\frac{G_T}{G'_T}\right|^2. \quad (7)$$

In some embodiments, receiver gain step $$\left|\frac{G_R}{G'_R}\right|^2$$

may also be determined in similar matter.

Figure 2:
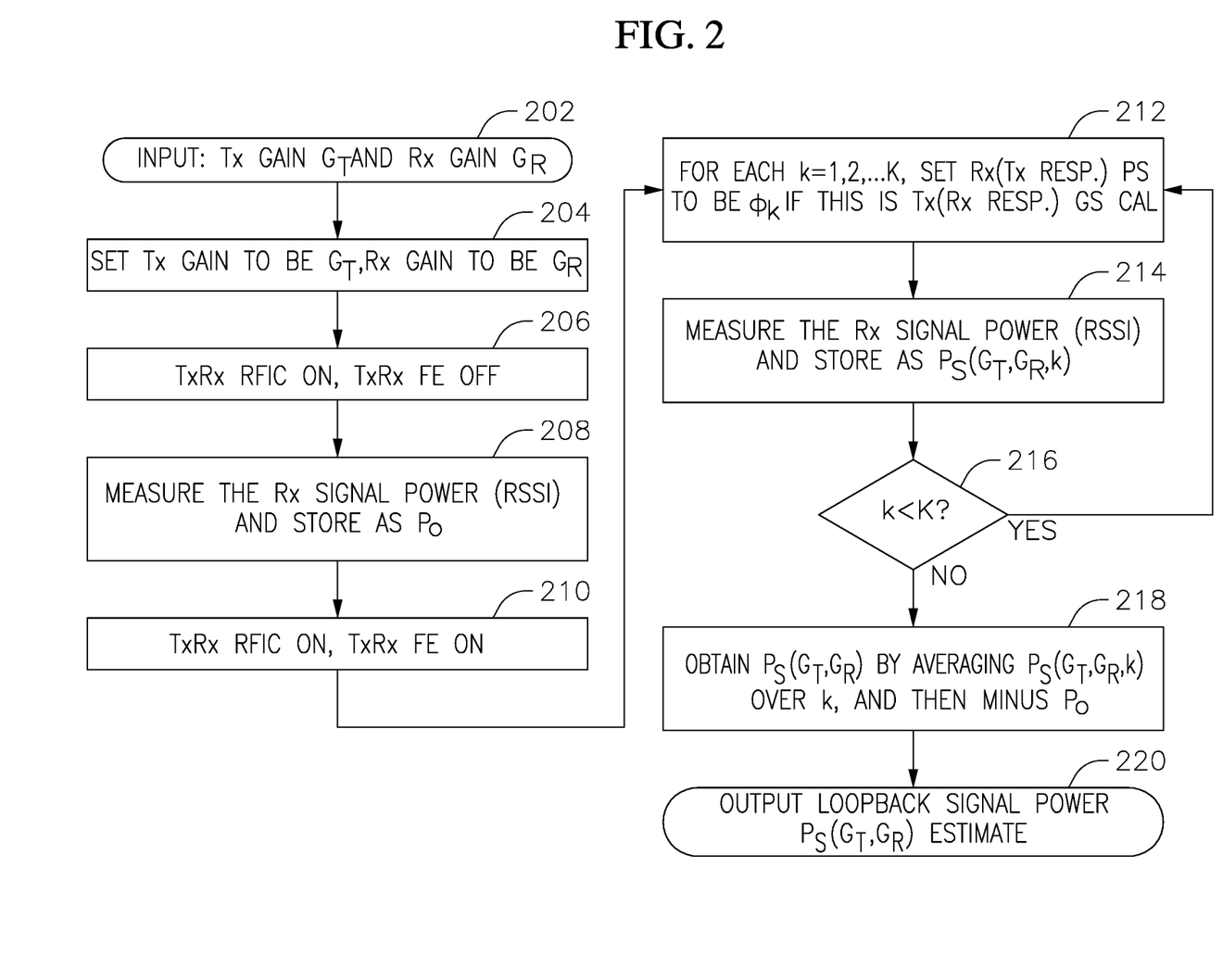
FIG. 2 illustrates a flowchart of a method of estimating the loopback signal power using phase averaging (PhAvg), according to some embodiments of the present disclosure.

FIG. 2 illustrates a flowchart of a method of estimating the loopback signal power $P_s(G_T, G_R)$ using the phase averaging (PhAvg) method, as discussed above. The method of FIG. 2 may be implemented by an UE that includes an RFIC and front end, for example, the RFIC 104 and the front end 102 discussed with respect to FIGS. 1A-1D.

At 202-204, the transmitter gain is set as $G_T$ and the receiver gain is set as $G_R$ by the UE. For example, in some embodiments, the UE may choose the l th antenna path for Tx (where l=1, 2, . . . , $L_T$) with gain $G_T$, and choose a proper Rx antenna path m∈1, 2, . . . , $L_R$ and a proper Rx gain state $G_R$ for Tx-Rx loopback.

Next, at 206, in order to measure the leakage signal power $P_{leak}$ plus noise power $\sigma^2$, the UE turns on the RFIC but turns off the front-end (e.g., as illustrated in FIG. 1D) (for example, to measure the leakage plus noise, only the Rx antenna path m is turned on, e.g., antennas are all at the phase-array and are all off).

At 208, the UE measures the leakage signal power $P_{leak}$ plus noise power $\sigma^2$ and the measured power (e.g., $P_0$) may be stored in UE memory. The leakage signal power plus noise power may be represented as:

$$P_0 = P_{leak} + \sigma^2,$$

where $$P_{leak} = (1/N)\sum_{n=1}^{N} |G_R^{leak} h_{leak} G_T^{leak} x[n]|^2$$

is the leakage signal power and $\sigma^2$ is the noise power.

At 210, the UE turns on the RFIC and the front-end (e.g., as illustrated in FIG. 1C) to measure the loopback total power. For example, at 210, the UE turns on both the l th antenna path for Tx and m th antenna path for Rx.

At 212-214, for each phase shifter $\phi_k$, k=1, 2 . . . K, the UE measures loopback signal power $P_s(G_T, G_R, k)$ (for example, for each phase shifter $\phi_k$, k=1, 2 . . . K, the UE measures the total Rx signal power $P_T(G_T, G_R, k)$ as discussed in equation (4)). $P_T(G_T, G_R, k)$ is stored in a memory. 212-214 continues in a loop until k=K, for example, until UE measures the loopback signal power $P_T(G_T, G_R, k)$ for all of the K phase on the Rx path. In some embodiments, the total Rx signal power $P_T(G_T, G_R, k)$ may be determined based on loopback signal power $P_s(G_T, G_R, k)$ for each phase shifter $\phi_k$ (k=1, 2 . . . K), from among K phase shifters of the UE.

At 216, if it is determined that k is not less than K (e.g., k=K), at 218-220, the total Rx signal power $P_T(G_T, G_R, k)$ may be averaged over different phase shifters with values such that $\Sigma_k e^{j\Phi_k}=0$ and the correlated terms may be canceled. For example, by using K different PS such that $$\sum_{k=1}^{K} e^{j\phi_k} = 0. \quad (8)$$

The loopback signal power $\hat{P}_s(G_T, G_R)$ for gain $G_T$ may be determined by subtracting the leakage signal power plus noise power ($P_0$) from the averaged total Rx signal power $P_T(G_T, G_R, k)$. As such, the loopback signal power $\hat{P}_s(G_T, G_R)$ may be represented as:

$$\hat{P}_s(G_T, G_R) = \frac{1}{K}\sum_{k=1}^{K} P_T(G_T, G_R, k) - P_0. \quad (9)$$

In one or more embodiments of the present disclosure, the loopback signal power $\hat{P}_s(G'_T, G_R)$ for gain $G'_T$ may be determined by subtracting the leakage signal power plus noise power ($P_0$) from the averaged total Rx signal power $P_T(G'_T, G_R, k)$. As such, the loopback signal power $\hat{P}_s(G'_T, G_R)$ may be represented as:

$$\hat{P}_s(G'_T, G_R) = \frac{1}{K}\sum_{k=1}^{K} P_T(G'_T, G_R, k) - P_0$$

Coherent Phase Combining

In one or more embodiments of the present disclosure, coherent phase combining may also be used to nullify or reduce the effect of the IF leakage and determine gain step accordingly.

In one or more embodiments, the coherent phase combining (CPC) method combines the antenna-coupling loopback signal coherent to each phase shifter while cancelling the incoherent leakage signal due to $$\sum_{k=1}^{K} e^{j\phi_k} = 0,$$

where $e^{j\phi_k}$ is the PS effect $$\left(\text{and hence } \sum_{k=1}^{K} e^{-j\phi_k} = 0\right).$$

If it is assumed that the total loopback measurement signal $y_k[n]$ (as in equation (1)) is synchronized with the Tx generated signal $x_k[n]$, the signal of different phase shifters may be coherently combined to obtain the loopback signal as:

$$y[n] = \frac{1}{K} \sum_{k=1}^{K} e^{-j\phi_k} y_k[n] = G_R h_{TxRx} G_T L_{FPCB} x[n] + w[n], \quad (10)$$

where $$w[n] = (1/K) \sum_{k=1}^{K} e^{-j\phi_k} w_k[n].$$

Therefore, the power of the loopback signal y[n] may be estimated as $$\hat{P}_s(G_T, G_R) = \frac{1}{N} \sum_{n=1}^{N} |y[n]|^2 - \frac{\sigma^2}{K}. \quad (11)$$

Similarly, the loopback signal power for a different gain state $G'_T$ may be measured the same way and may be represented as $\hat{P}_s(G'_T, G_R)$.

As discussed with respect to equation (3), next, the gain step by $\hat{P}_s(G_T, G_R)$ and $\hat{P}_s(G'_T, G_R)$ may be estimated as:

$$\left|\frac{G_T}{G'_T}\right|^2 = \frac{\hat{P}_s(G_T, G_R)}{\hat{P}_s(G'_T, G_R)} \approx \frac{|G_R h_{TxRx} G_T L_{FPCB}|^2}{|G_R h_{TxRx} G'_T L_{FPCB}|^2} = \left|\frac{G_T}{G'_T}\right|^2 \quad (12)$$

Figure 3:
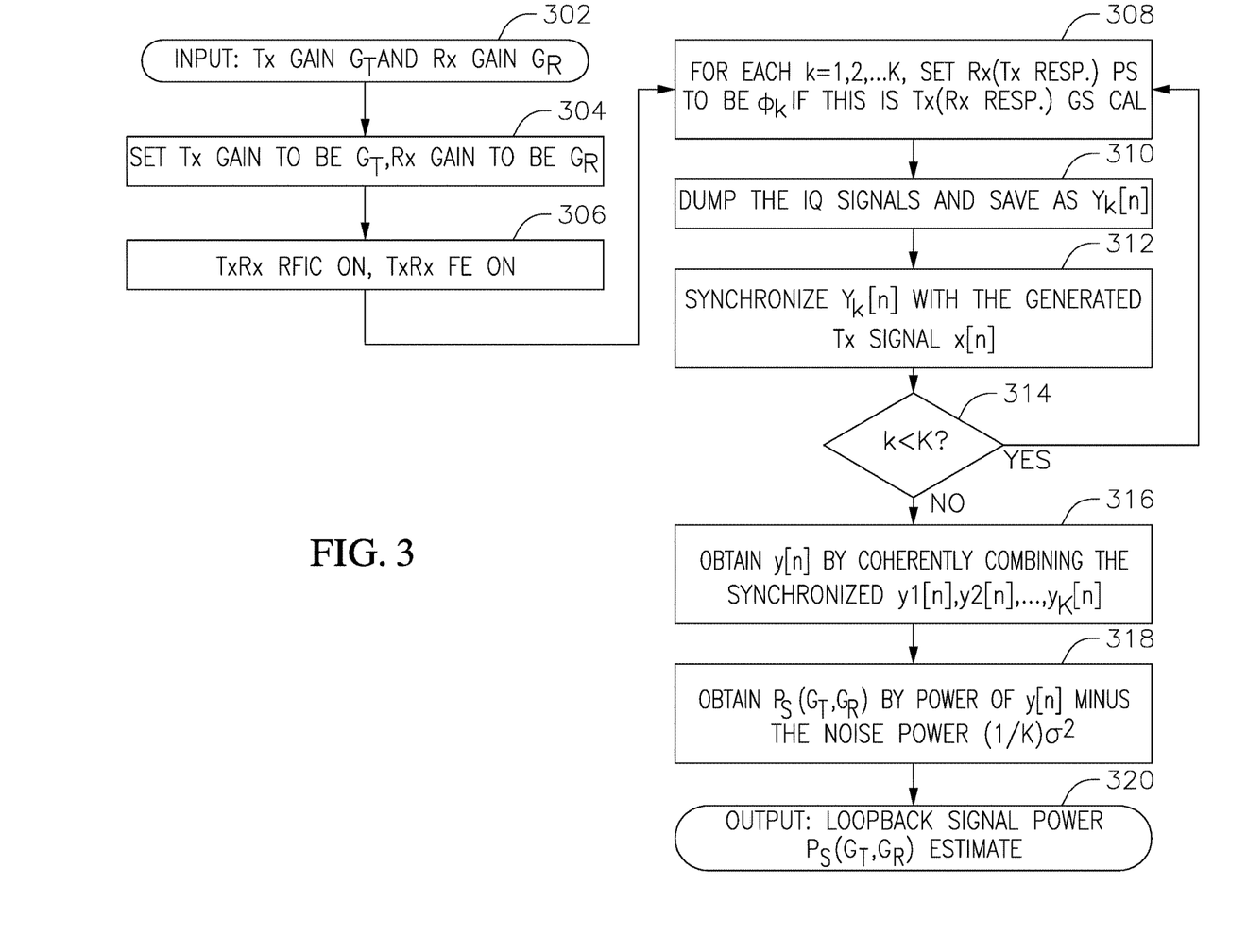
FIG. 3 illustrates a flowchart of a method of estimating the loopback signal power using coherent phase combining (CPC), according to some embodiments of the present disclosure.

FIG. 3 illustrates a flowchart of a method of estimating the loopback signal power $P_s(G_T, G_R)$ using the coherent phase combining (CPC) method, as discussed above. The method of FIG. 3 may be implemented by an UE that includes a RFIC and front end, for example the RFIC and the front end discussed with respect to FIGS. 1A-1D.

At 302-304, the transmitter gain is set as $G_T$ and the receiver gain is set as $G_R$ by the UE (for example, the UE may only turn on the l th antenna path for Tx (where l=1, 2, . . . , $L_T$) with gain $G_T$, and choose a proper Rx antenna path m∈1, 2, . . . , $L_R$ and a proper Rx gain state $G_R$ for Tx-Rx loopback.

At 306, the UE turns on the RFIC and the front-end (e.g., as illustrated in FIG. 1C).

At 308-310, for each phase shifter $\phi_k$, k=1, 2 . . . K, the UE measures the loopback in-phase and quadrature (IQ) samples, such that $\Sigma_k e^{j\phi_k}=0$, where $e^{j\phi_k}$ is the PS effect $$\left(\text{and hence } \sum_{k=1}^{K} e^{-j\phi_k} = 0\right).$$

For example, for each phase shifter $\phi_k$, k=1, 2 . . . K, the total loopback measurement signal $y_k[n]$ (as in equation (1)) may be saved in a memory of the UE.

At 312, the total loopback measurement signal $y_k[n]$ (as in equation (1)) for each phase shifter $\phi_k$, k=1, 2 . . . K, is synchronized with the Tx generated signal $x_k[n]$.

308-312 continues in a loop until k=K, for example, until UE measures the loopback measurement signal $y_k[n]$ for all of the K phase shifters from the $\phi_k$, k=1, 2 . . . K phase shifters on the Rx path.

At 314, if it is determined that k is not less than K (e.g., k=K), at 316, the synchronized signals of different phase shifters (e.g., $\phi_k$, k=1, 2 . . . K) are coherently combined to obtain the loopback signal as:

$$y[n] = \frac{1}{K} \sum_{k=1}^{K} e^{-j\phi_k} y_k[n] = G_R h_{TxRx} G_T L_{FPCB} x[n] + w[n], \quad (13)$$

where $$w[n] = (1/K) \sum_{k=1}^{K} e^{-j\phi_k} w_k[n],$$

while cancelling the incoherent leakage signals due to $$\sum_{k=1}^{K} e^{j\phi_k} = 0,$$

where $e^{j\phi_k}$ is the PS effect $$\left(\text{and hence } \sum_{k=1}^{K} e^{-j\phi_k} = 0\right).$$

At 318-320, the power of the loopback signal y[n] is estimated as $$\hat{P}_s(G_T, G_R) = \frac{1}{N} \sum_{n=1}^{N} |y[n]|^2 - \frac{\sigma^2}{K} \quad (14)$$

Phase Differencing

In one or more embodiments of the present disclosure, phase differencing may also be used to nullify or reduce the effect of the IF leakage and determine gain step accordingly.

In one or more embodiments, the phase differencing method takes the difference of the quadrature signals or IQ samples of the loopback measurement for two distinct phase shifters $e^{j\Phi_1}$ and $e^{j\Phi_2}$, which may be represented as:

$$y[n] = \\ y_1[n] - y_2[n] = (e^{j\phi_1} - e^{j\phi_2})G_R h_{TxRx} G_T L_{FPCB} x[n] + (w_1[n] - w_2[n]) \quad (15)$$

Therefore, a scaled version of the loopback signal power may be estimated as:

$$\hat{P}_s(G_T, G_R) = \frac{1}{N}\sum_{n=1}^{N}|y[n]|^2 - 2\sigma^2 \approx |(e^{j\phi_1} - e^{j\phi_2})G_R h_{TxRx} G_T L_{FPCB}|^2 \quad (16)$$

Where $w_1[n]$ and $w_2[n]$ are the additive noise with respect to the two distinct phase shifters $e^{j\Phi_1}$ and $e^{j\Phi_2}$.

Similarly, the loopback signal power for a different gain state $G'_T$ may be measured the same way and may be represented as $\hat{P}_s(G'_T, G_R)$.

As discussed with respect to equation (3), next, the gain step by $\hat{P}_s(G_T, G_R)$ and $\hat{P}_s(G'_T, G_R)$ may be estimated as:

$$\left|\frac{G_T}{G'_T}\right|^2 = \frac{\hat{P}_s(G_T, G_R)}{\hat{P}_s(G'_T, G_R)} \approx \frac{|(e^{j\phi_1} - e^{j\phi_2})G_R h_{TxRx} G_T L_{FPCB}|^2}{|(e^{j\phi_1} - e^{j\phi_2})G_R h_{TxRx} G'_T L_{FPCB}|^2} = \left|\frac{G_T}{G'_T}\right|^2 \quad (13)$$

As evident from above, the gain step estimation as discussed in equation (13) is done by comparing $\hat{P}_s(G_T, G_R)$ and $\hat{P}_s(G'_T, G_R)$ despite of the scaling($e^{j\Phi_1}-e^{j\Phi_2}$).

Figure 4:
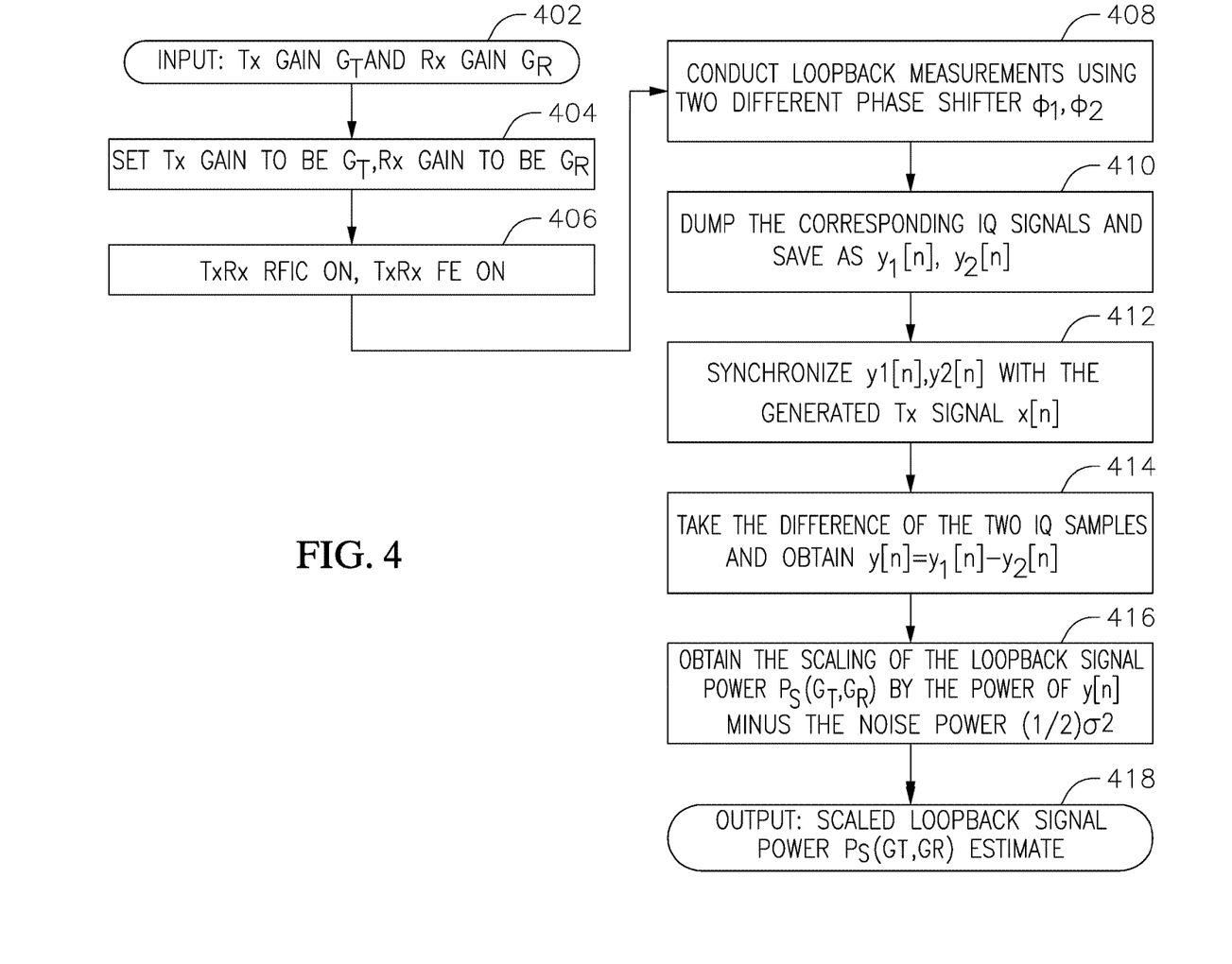
FIG. 4 illustrates a flowchart of a method of estimating the loopback signal power using phase differencing, according to some embodiments of the present disclosure.

FIG. 4 illustrates a flowchart of a method of estimating the loopback signal power $P_s(G_T, G_R)$ using the phase differencing method, as discussed above. The method of FIG. 4 may be implemented by an UE that includes a RFIC and front end, for example the RFIC and the front end discussed with respect to FIGS. 1A-1D.

At 402-404, the transmitter gain is set as $G_T$ and the receiver gain is set as $G_R$ by the UE.

At 406, the UE turns on the RFIC and the front-end (e.g., as illustrated in FIG. 1C).

At 408-410, for each of the two different phase shifter $\phi_1$ and $\phi_2$ (e.g., for K=2), the UE measures the loopback IQ samples. For example, for the phase shifter $\phi_1$, the UE may save the quadrature signals or IQ samples of the loopback measurement as $y_1[n]$ (e.g., as in equation (1)), and for the phase shifter $\phi_2$, the UE may save the quadrature signals or IQ samples of the loopback measurement as $y_2[n]$ (e.g., as in equation (1)).

At 412, each of the loopback measurement signals $y_1[n]$ and $y_2[n]$ is synchronized with the Tx generated signal $x_k[n]$.

At 414, the UE takes the difference of the quadrature signals or IQ samples of the loopback measurement for two distinct phase shifters $e^{j\Phi_1}$ and $e^{j\Phi_2}$, which may be represented as:

$$y[n] = \\ y_1[n] - y_2[n] = (e^{j\phi_1} - e^{j\phi_2})G_R h_{TxRx} G_T L_{FPCB} x[n] + (w_1[n] - w_2[n]) \quad (17)$$

Therefore, the loopback signal $y[n]$ is determined based on a difference between the quadrature signals or IQ samples of the loopback measurement for the phase shifter $\phi_1$ and the quadrature signals or IQ samples of the loopback measurement for the phase shifter $\phi_2$.

At 416, the UE determines a scaled version of the loopback signal $y[n]$ power by subtracting noise power $\sigma^2$ (e.g., $\sigma^2/2$) from the power of the loopback signal $y[n]$. For example, the scaled version of the loopback signal power may be:

$$\hat{P}_s(G_T, G_R) = \frac{1}{N}\sum_{n=1}^{N}|y[n]|^2 - 2\sigma^2 \approx |(e^{j\phi_1} - e^{j\phi_2})G_R h_{TxRx} G_T L_{FPCB}|^2 \quad (18)$$

At 418, the scaled loopback signal power $\hat{P}_s(G_T, G_R)$ is obtained.

Figure 5:
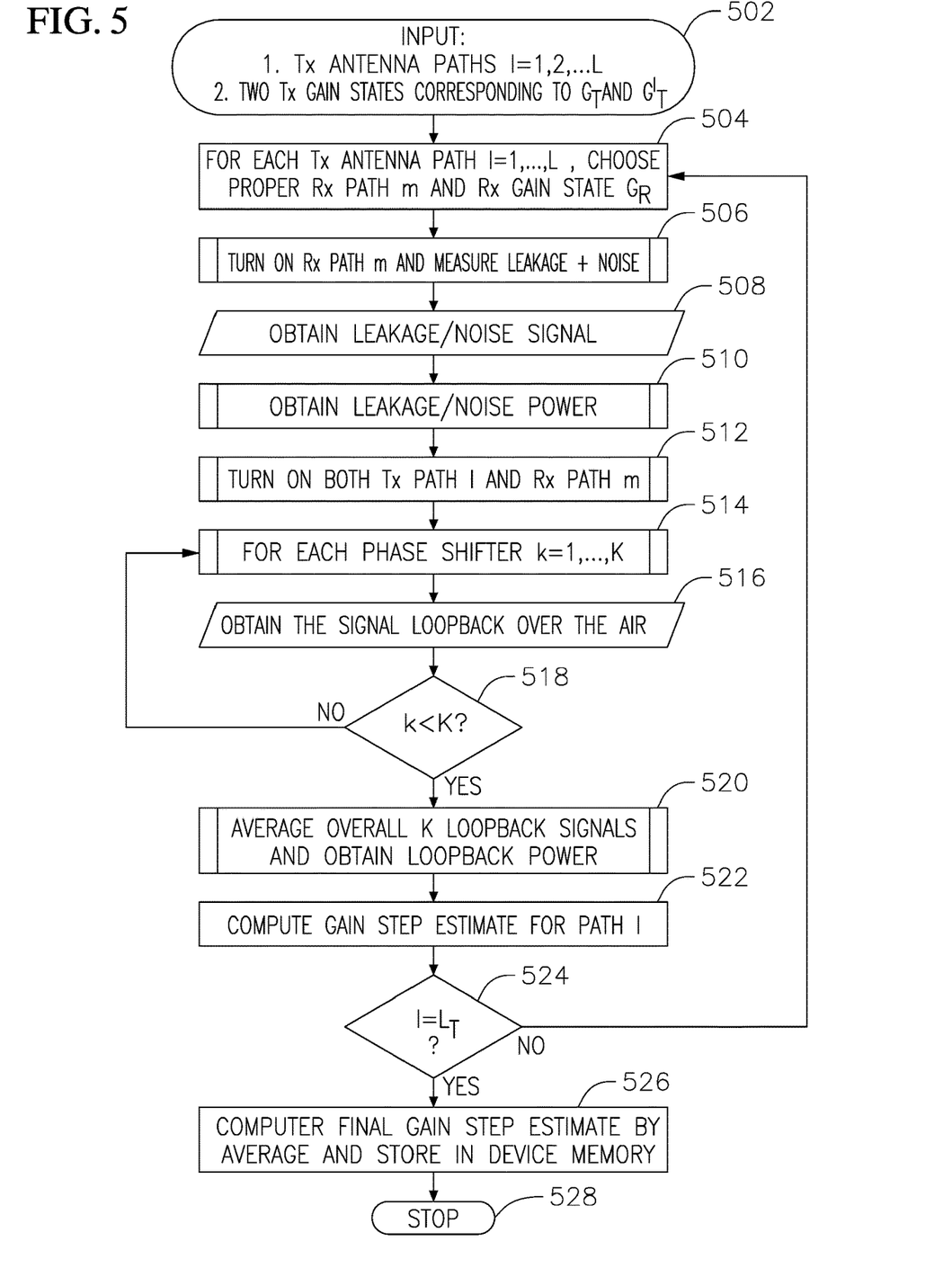
FIG. 5 illustrates a flowchart of a method of estimating gain step, according to some embodiments of the present disclosure.

FIG. 5 illustrates a flowchart of a method of estimating gain step. The method of FIG. 5 may be implemented by an UE that includes a RFIC and front end, for example the RFIC and the front end discussed with respect to FIGS. 1A-1D.

At 502, the UE sets Tx antenna paths $l=1, 2, \ldots, L_T$, and two different Tx gain states $G_T$, $G'_T$.

At 504, for each Tx antenna path $l=1, 2, \ldots, L_T$, the UE may choose a proper Rx antenna path $m \in 1, 2, \ldots, L_R$ and a proper Rx gain state $G_R$.

At 506-508, the UE turns on only the Rx antenna path m (for example, in order to measure the leakage signal power $P_{leak}$ plus noise power $\sigma^2$, the UE turns on the RFIC but turns off the front-end) and measures the leakage signal plus noise, which may be represented as $y_{leak}[n]=G_R^{leak} h_{leak} G_T^{leak} x[n]+w_k[n]$, $n=1, \ldots, k=1, \ldots, K$, At 510, the UE determines the leakage signal power $P_{leak}$ plus noise power $\sigma^2$ and the measured power (e.g., $P_0$) may be stored. The leakage signal power plus noise power may be represented as: $P_0=P_{leak}+\sigma^2$, where $$P_{leak} = (1/N)\sum_{n=1}^{N}|G_R^{leak} h_{leak} G_T^{leak} x[n]|^2$$

is the leakage signal power and $\sigma^2$ is the noise power.

At 512, the UE turns on both the l th antenna path for Tx and m th antenna path for Rx (e.g., the UE turns on the RFIC and the front-end (e.g., as illustrated in FIG. 1C) to measure the loopback total power).

At 514-516, for each phase shifter $\phi_k$, $k=1, 2 \ldots K$, the UE measures loopback signal. 514-514 continues in a loop until k=K, for example, until UE measures loopback signal for all of the K phase shifters from the $\phi_k$, $k=1, 2 \ldots K$ phase shifters on the Rx path.

At 518, if it is determined that k=K, at 520, the loopback signal power $P_T(G_T, G_R, k)$ of different phase shifters are averaged or combined with values such that $\Sigma_k e^{j\Phi_k}=0$ and the correlated terms may be canceled. For example, by using K different PS such that $$\sum_{k=1}^{K} e^{j\phi_k} = 0, \quad (19)$$

the loopback signal power $\hat{P}_s(G_T, G_R)$ may be estimated as $$\hat{P}_s(G_T, G_R) = \frac{1}{K}\sum_{k=1}^{K} P_T(G_T, G_R, k) - P_0. \quad (20)$$

Similarly, the loopback signal power for a different gain state $G'_T$ may be determined the same way and may be represented as $\hat{P}_s(G'_T, G_R)$.

At 522, the gain step by $\hat{P}_s(G_T, G_R)$ and $\hat{P}_s(G'_T, G_R)$ for path Tx antenna path l may be estimated as:

$$\left|\frac{\overline{G_T}}{\overline{G'_T}}\right|^2 = \frac{\hat{P}_s(G_T, G_R)}{\hat{P}_s(G'_T, G_R)} \approx \frac{|G_R h_{TxRx} G_T L_{FPCB}|^2}{|G_R h_{TxRx} G'_T L_{FPCB}|^2} = \left|\frac{G_T}{G'_T}\right|^2. \quad (21)$$

504-522 continues in a loop until the gain steps for all Tx antenna paths l=1, 2, ..., $L_T$, are determined.

At 524, if it is determined that l=$L_T$ (for example, the gain steps for all Tx antenna paths l=1, 2, ..., $L_T$, are determined), at 526, the overall gain step of activating all {1, 2, ..., $L_T$} antenna paths is estimated by $$\left(\frac{\overline{G_T}}{\overline{G'_T}}\right)^2 = \text{average}_{l=1,2,...,L_T}\left(\frac{\overline{G_T}}{\overline{G'_T}}\right)_l^2. \quad (14)$$

The overall gain step is saved in the UE memory.

In some embodiments, the average function of the overall gain step over multiple antenna paths in (14) can be in dB, linear, and/or weighted average. In some embodiments, for Tx gain step calibration, the selection of proper Rx antenna path and Rx gain state can be optimized for a type of device, or select based on the power measurement such as $$(G_R(l), m(l)) = \text{argmin}_{G_R,m}|P_{loopback}(G_T, G_R, l, m) - (P_{leakage}(G_T, G_R, l, m) + C)|^2 \quad (15)$$

where C is a threshold to offset a desired level between the loopback signal and the leakage signal, m∈{1, 2, ..., $L_R$} is the m th Rx antenna path, and where $$P_{loopback}(G_T, G_R, l, m) = \frac{1}{NK}\sum_{k=1}^{K}\sum_{n=1}^{N}|y_k^{(l,m)}[n]|^2, \text{ and}$$

$$P_{leakage}(G_T, G_R, l, m) = \frac{1}{N}\sum_{n=1}^{N}|y_{leak}^{(l,m)}[n]|^2$$

are the corresponding loopback and leakage power measurements by using Tx gain state $G_T$, Rx gain state $G_R$, Tx antenna path l and Rx antenna path m.

In some embodiments, the Tx gain step calibration as discussed with respect to the method of FIG. 5, may also be determined by activating multiple Tx/Rx antenna paths at a time. In some embodiments, the Rx gain step calibration in (3) may also be determined one Rx antenna path at a time and combine in the same way as in (14).

Although example embodiments of Method and Apparatus For Loopback Gain Step Calibration On Rf Chain With Phase Shifter have been specifically described and illustrated herein, many modifications and variations will be apparent to those skilled in the art. Accordingly, it is to be understood that Method and Apparatus For Loopback Gain Step Calibration On Rf Chain With Phase Shifter according to principles of this disclosure may be embodied other than as specifically described herein. The present disclosure is also defined in the following claims, and equivalents thereof.

What is claimed is:

1. A method of gain step calibration by a user equipment (UE) comprising:
   selecting, by the UE, a l th antenna path having a gain $G_T$ for a transmitter (Tx) of the UE and a corresponding m th antenna path having a gain $G_R$ for a receiver (Rx) of the UE;
   determining, by the UE, a first loopback signal power for the l th antenna path having the gain $G_T$ for the transmitter (Tx) of the UE and the corresponding m th antenna path having the gain $G_R$ for the receiver (Rx) of the UE;
   determining, by the UE, a second loopback signal power for the l th antenna path having a gain $G'_T$ for the transmitter (Tx) of the UE and the corresponding m th antenna path having the gain $G_R$ for the receiver (Rx) of the UE; and
   determining, by the UE, a transmitter gain step of the UE based on the first loopback signal power and the second loopback signal power.

2. The method of claim 1, wherein the transmitter gain step is a ratio of the first loopback signal power and the second loopback signal power, and wherein l=1, 2, ..., $L_T$ and m∈1, 2, ..., $L_R$.

3. The method of claim 2, further comprising:
   turning on, by the UE, the m th antenna path with the gain $G_R$ for the receiver (Rx) of the UE;
   measuring, by the UE, leakage signal power and noise power; and
   turning on, by the UE, the l th antenna path for the transmitter (Tx) and the corresponding m th antenna path for the receiver (Rx) to determine the first loopback signal power and the second loopback signal power.

4. The method of claim 3, wherein determining the first loopback signal power comprises:
   determining loopback signal power for each phase shifter from among K phase shifters, for the l th antenna path having the gain $G_T$ for the transmitter (Tx) and the corresponding m th antenna path having the gain $G_R$ for the receiver (Rx); and
   determining, by the UE, total receiver (Rx) signal power based on the loopback signal power for each phase shifter from among K phase shifters.

5. The method of claim 4, further comprising:
   averaging the total receiver (Rx) signal power for gain $G_T$ over K different phase shifters with values such that $$\sum_{k=1}^{K} e^{j\phi_k} = 0,$$

wherein the correlated terms are canceled.

6. The method of claim 5, wherein the first loopback signal power for the gain $G_T$ is determined by subtracting the leakage signal power and noise power from the averaged total receiver (Rx) signal power for the gain $G_T$; and wherein the second loopback signal power for the gain $G'_T$ is determined by subtracting the leakage signal power and noise power from the averaged total receiver (Rx) signal power for the gain $G'_T$.

7. The method of claim 6, wherein the total power measured at the receiver (Rx) for the gain $G_T$ comprises the first loopback signal power for the gain $G_T$ and the leakage signal power.

8. The method of claim 7, further comprising:
determining, by the UE, gain steps for each of the antenna paths $l=1, 2, \ldots, L_T$ for the transmitter (Tx).

9. The method of claim 8, further comprising:
determining, by the UE, an overall gain step of all of the antenna paths $l=1, 2, \ldots, L_T$ by averaging the gain steps for each of the antenna paths $l=1, 2, \ldots, L_T$.

10. A method of gain step calibration by a user equipment (UE) comprising:
turning on, by the UE, a l th antenna path having a gain $G_T$ for a transmitter (Tx) of the UE and a corresponding m th antenna path having a gain $G_R$ for a receiver (Rx) of the UE;
measuring, by the UE, loopback quadrature signals or in-phase and quadrature (IQ) samples for each phase shifters from among K phase shifters of the UE;
determining, by the UE, loopback measurement signal for each phase shifter from among K phase shifters of the UE based on the measured loopback IQ samples of the corresponding phase shifter;
synchronizing, by the UE, the loopback measurement signal for each phase shifter, of the K phase shifters of the UE with a transmitter (Tx) generated signal; and
determining, by the UE, a first total loopback signal by coherently combining the synchronized loopback measurement signals for each of the K phase shifters of the UE.

11. The method of claim 10, wherein the first total loopback signal comprises phase shift effect of each of the K phase shifters, the transmitter (Tx) generated signal, an equivalent base band (BB) channel of over-the-air loopback coupling path between the l th antenna path for the transmitter (Tx) and the m th antenna path for the receiver (Rx), a flexible printed circuit board (FPCB) cable loss, and additive noise.

12. The method of claim 11, wherein the total loopback signal is determined such that $\Sigma_k e^{j\Phi_k}=0$, where $e^{j\Phi_k}$ is the phase shift effect, wherein $$\sum_{k=1}^{K} e^{-j\phi_k} = 0,$$

and wherein the method further comprises:
cancelling, by the UE, incoherent leakage signals of the loopback measurement signal for each phase shifter of the K phase shifters.

13. The method of claim 12, further comprising:
determining, by the UE, a first loopback signal power for the l th antenna path having the gain $G_T$ for the transmitter (Tx) and the corresponding m th antenna path having the gain $G_R$ for the receiver (Rx);
determining, by the UE, a second loopback signal power for the l th antenna path having a gain $G'_T$ for the transmitter (Tx) of the UE and the corresponding m th antenna path having the gain $G_R$ for the receiver (Rx) of the UE; and determining, by the UE, a transmitter gain step of the UE based on the first loopback signal power and the second loopback signal power.

14. The method of claim 13, wherein the transmitter gain step is a ratio of the first loopback signal power and the second loopback signal power, and wherein $l=1, 2, \ldots, L_T$ and $m \in 1, 2, \ldots, L_R$.

15. The method of claim 14, wherein the first loopback signal power is determined by subtracting $$\frac{\sigma^2}{K}$$

from power of the first total loopback signal, where K is the total number of phase shifters and $\sigma^2$ is noise power.

16. A method of gain step calibration by a user equipment (UE) comprising:
turning on, by the UE, a l th antenna path having a gain $G_T$ for a transmitter (Tx) of the UE and a corresponding m th antenna path having a gain $G_R$ for a receiver (Rx) of the UE;
measuring, by the UE, loopback quadrature signals or in-phase and quadrature (IQ) samples for a first phase shifter and a second phase shifter of the UE;
determining, by the UE, a first loopback measurement signal for the first phase shifter and a second loopback measurement signal for the second phase shifter based on the measured loopback IQ samples of the first phase shifter and the second phase shifter;
synchronizing, by the UE, each of the first loopback measurement signal for the first phase shifter and the second loopback measurement signal for the second phase shifter with a transmitter (Tx) generated signal; and
determining, by the UE, a first total loopback signal by determining a difference between the synchronized first loopback measurement signal for the first phase shifter and the synchronized second loopback measurement signal for the second phase shifter.

17. The method of claim 16, further comprising:
determining, by the UE, a first loopback signal power for the l th antenna path having the gain $G_T$ for the transmitter (Tx) of the UE and the corresponding m th antenna path having the gain $G_R$ for the receiver (Rx) of the UE; and
determining, by the UE, a second loopback signal power for the l th antenna path having a gain $G'_T$ for the transmitter (Tx) of the UE and the corresponding m th antenna path having the gain $G_R$ for the receiver (Rx) of the UE.

18. The method of claim 17, further comprising:
determining, by the UE, a transmitter gain step of the UE based on the first loopback signal power and the second loopback signal power.

19. The method of claim 18, wherein the transmitter gain step is a ratio of the first loopback signal power and the second loopback signal power, and wherein $l=1, 2, \ldots, L_T$ and $m \in 1, 2, \ldots, L_R$.

20. The method of claim 19, wherein the first loopback signal power is determined by subtracting noise power from power of the first total loopback signal.

* * * * *